Reissued Aug. 25, 1931 Re. 18,170

UNITED STATES PATENT OFFICE

LEON LILIENFELD, OF VIENNA, AUSTRIA

ARTIFICIAL THREAD AND PROCESS FOR MAKING SAME

No Drawing. Original No. 1,683,199, dated September 4, 1928, Serial No. 156,751, filed December 23, 1926, and in Austria June 20, 1925. Application for reissue filed August 16, 1930. Serial No. 475,840.

The invention is based upon the observation that artifical threads, for example artificial silk of high dry tenacity, are obtained by bringing viscose into the form of a thread and causing to act upon the formed thread one or more agents which have upon viscose the two following effects:

1. A coagulating effect upon the formed but not yet coagulated thread, and
2. A dissolving or swelling up or plasticizing action upon the coagulated thread.

Observations made under the miscroscope indicate that the combination of the two actions described above results in a high dry tenacity, because the coagulation combined with either a plasticization of the thread or with a filling out of the interstices by the swollen or dissolved parts of the thread or both, imparts to the thread a much higher continuity than the coagulation by itself. In addition to this, the plasticization which takes place simultaneously with, or subsequently to the coagulation, makes the coagulated thread capable of being stretched during spinning to a degree unattainable if an agent is used which has a coagulating action only and no or very little plasticizing effect.

According to the invention, the dissolving or swelling or plasticizing action of the setting bath must not be prolonged until the cellulose thread is attacked by the destroying or depolymerizing action the bath may have on the thread during its passage through the bath itself or during the air passage between the bath and the collecting device.

In other words: The time during which the tread is in contact with the coagulating liquid must be so chosen that no destruction or depolymerization and no considerable loss in weight (calculated on the content of cellulose of the original viscose on the one hand and the weight of the thread produced on the other) takes place, and the action of the liquid must be checked before it has an injurious effect upon the thread.

I have further observed that strong mineral acids, particularly strong sulphuric acid, are specially suitable for the carrying out of the inventive idea underlying the present process: The combination of a coagulating action on the one hand and of a plasticizing action on the other, on formed viscose.

In carrying out my invention, artificial threads or viscose silk of high dry tenacity, exceeding 2 grammes per denier, can be made for example by bringing the viscose into the form of a thread and causing to act upon the formed thread sulphuric acid containing not less than about 50 per cent. for example about 55 per cent. of $H_2SO_4$, and preferably sulphuric acid containing more than 55 per cent. for example 65 to 86 per cent. of $H_2SO_4$.

My discovery that such strong sulphuric acid can be used as coagulating bath in the manufacture of artificial threads from viscose is surprising, it having been stated that with sulphuric acid of various degrees of concentration between 5% and 40% $H_2SO_4$, threads have been obtained, which, regarded microscopically, appear to be covered with fine scales, while with concentrated sulphuric acid the formation of a lustrous thread, band or the like is completely spoilt (see Max Müller's U. S. Patent 836,452).

It is still more surprising that I can manufacture from viscose by means of such strong sulphuric acid, threads which have a tensile strength that surpasses that of any artificial thread known hitherto and in some cases approaches, in some cases equals, and in some cases even surpasses that of natural fibres, such as cotton or real silk. For example, I am able to produce according to the present process artificial silk or staple fibre that has a dry tenacity of considerably more than 2 grammes and even more than 3 grammes per denier, for example 3 or even 3.5 to 4 grammes per denier, and in some cases even more than 4, or in some cases even 5 grammes per denier or more, and a wet tenacity of 1.5 to 2.5 grammes per denier and more.

A further advantage of the artificial threads manufactured according to the present process over ordinary viscose silk is their higher resistance to aqueous alkalies and to soap.

I have further found that it is advantageous to the tensile strength of the artificial threads, manufactured according to the present process, to apply additional stretch to the threads either in the coagulating bath or between the coagulating bath and the collecting device or in both places. The process yields however quite good results also when only such stretch is applied as is usual in the viscose artificial silk art, particularly when spinning machines with a long air passage or high spinning speed or both are employed.

The process is carried out by bringing viscose into the form of an artificial thread and coagulating it by means of sulphuric acid containing at least about 50, preferably about 55 per cent. of $H_2SO_4$, for example sulphuric acid containing 55 to 85 per cent. of monohydrate.

In most cases this can be effected in such a manner that the viscose is caused to pass through suitably formed openings into sulphuric acid, containing 55 to 98 per cent. of $H_2SO_4$, for instance acid of 65 to 85 per cent. strength (calculated as $H_2SO_4$), or into a bath containing 55 to 98 per cent. for instance 65 to 85 per cent. of sulphuric acid monohydrate. The strong sulphuric acid may be employed by itself, or, so far as is compatible with the conditions under which it is used, in admixture with a suitable quantity of one or more suitable inorganic substances, for example with another strong mineral acid, such as hydrochloric acid, nitric acid or phosphoric acid, or with a neutral or acid salt, such as sodium sulphate, sodium bisulphate, ammonium sulphate, magnesium sulphate, zinc sulphate, sodium bisulphite, sodium sulphite, sodium nitrite or boric acid. Again, so far as is compatible with the conditions under which it is used, to the strong sulphuric acid or its mixture with another strong acid or with one or more of the inorganic substances mentioned above, there may be added a suitable quantity of one or more organic bodies, such as glycerol or a sugar, for example glucose, or alcohol or a salt of an organic base, for example, of aniline, or an organic acid, such as acetic acid or formic acid or lactic acid or oxalic acid. If a salt is added which is capable of reacting with the strong sulphuric acid with formation of an acid sulphate, or which mutually interacts with the sulphuric acid, the strength of the sulphuric acid should be so chosen that, after the amount required for the formation of the acid sulphate or for the mutual interaction is used up, the coagulating bath contains free sulphuric acid of the desired strength, but at any rate not less than about 50, preferably about 55 parts by weight of monohydrate in 100 parts by weight of the precipitating bath.

The process may also be carried out in such a manner that the formed thread is first coagulated by means of a setting bath known from the viscose artificial silk art regardless whether such bath coagulates the viscose in a form soluble or insoluble in water, whereupon the thread is treated with a liquid that consists of, or contains one or more stronger mineral acids, preferably strong sulphuric acid for example such as 50 to 94 per cent or more strength (calculated on monohydrate). This can be done, for example so, that the viscose is forced to pass through suitably formed apertures into a coagulating bath known from the viscose artificial silk art, for instance into a solution of ammonium sulphate or sodium bisulphate or into dilute sulphuric acid, for instance such of 10 per cent strength, or into dilute sulphuric acid containing sodium sulphate or sodium bisulphate, or into a liquid containing ammonium sulphate and sulphuric acid, and that the thread, after having been immersed in said bath for a longer or shorter time or distance, is introduced into a second bath which consists of, or contains one or more strong mineral acids, preferably strong sulphuric acid, for example such of 50 to 85 per cent of $H_2SO_4$.

The strength of the sulphuric acid depends, ceteris paribus, partly on the time of maturing given the alkali cellulose, partly on the time of ripening given the finished viscose and partly on the viscosity of the viscose or amount of cellulose contained in the viscose. As a rule, to which, however, the invention is not confined, it may be stated that viscoses which have matured for several days and viscoses that have been prepared from alkali cellulose that has been allowed to mature for a relatively long time, for example 2 to 3 days, and viscoses that are poor in cellulose or little viscous, do not withstand so strong a sulphuric acid as viscoses that have not been allowed to mature or have been allowed to mature for a short time only, (for instance, 3 to 48 hours) and viscoses which have been prepared from alkali cellulose that has been not allowed to mature or has been allowed to mature for a shorter time than usual, for example 3 to 36 hours, and viscoses which are rich in cellulose or highly viscous. In fact, the best viscoses for use in this invention are such as if they contain the usual amount (for example 6 to 7 per cent) of cellulose have a viscosity of 2 or more, as compared with glycerine, the viscosity of which is taken as unity.

There is in some cases also advantage in using a viscose in the preparation of which there has been used carbon bisulphide amounting to over 40 per cent of the weight of the cellulose used in making the viscose. As a rule, when using the larger proportion of carbon bisulphide in the production of the viscose longer ageing of the viscose is desirable.

The strength of the sulphuric acid is further, to a certain degree, dependent on the length of immersion in the coagulating bath and the tension given the coagulated material in the acid or outside it, for example between the coagulating bath and the collecting device, for example bobbin.

The precipitating bath may be kept at room temperature or at a temperature exceeding room temperature, for example at 25 to 50° C. or at a temperature lower than room temperature, for example at 0 to 10° C., or even below 0° C., for example at from −1 to −10° C.

The length of the thread or filament immersed in the strong sulphuric acid or in the bath containing it, may be varied within wide limits, for example from 3 to 60 centimetres and even more, for instance 1 to 2 metres, depending generally on the spinning conditions, for instance on the age of the viscose, on the temperature and concentration of the spinning bath, on the speed of spinning, on the denier of filaments obtained.

If desired the thread may be stretched either immediately after its formation, that is in the coagulating bath containing, or consisting of strong sulphuric acid, or subsequently, that is between the coagulating bath and the collecting device, such as bobbin or centrifuge, or both in the coagulating bath and between the coagulating bath and the collecting device.

Since, during prolonged contact with sulphuric acid of the strengths used in my process, cellulose is attacked and ultimately destroyed, it is essential to check the action of the acid on the filament or the like formed, by washing or other means, for instance subjecting the formed thread to a low temperature, and this is preferably carried out before or during the deposition of the thread upon the bobbin or in the centrifugal box or similar device. This immediate checking of the action of the acid is of less importance if the thread or the like is collected in thin layers, in which case a somewhat delayed washing is possible; such collection in thin layers, however, is not the best practice, for reasons well-known to those skilled in the art.

The thread, after washing, may be heated or steamed before or after drying.

Any suitable viscose may be used in the present process. The process gives good results with viscoses that are prepared from alkali cellulose that has been allowed to mature for such a time as is commonly allowed for maturing alkali cellulose in the artificial silk art, but generally speaking more satisfactory results are obtained with viscoses in the manufacture of which alkali cellulose is used which has not been allowed to mature at all, or has been allowed to mature for a shorter time than is usual in the artificial silk art, that is, not longer than for example about 36 hours for example 1 to 24 hours.

As a further rule it may be stated that such viscoses as are prepared from alkali cellulose that has not been matured or has been matured for a shorter time than is usual in the artificial silk art, i. e. not longer than about 36 to 48 hours, for example 1 to 24 hours, yield strong threads if spun into sulphuric acid containing about 50 per cent $H_2SO_4$, whilst the lower limit of the concentration of the sulphuric acid for obtaining strong threads from viscoses prepared from alkali cellulose that has been matured for a longer time than 36 to 48 hours (according to the quality of the starting cellulose and to the temperature of maturing the alkali cellulose) is about 55 per cent of $H_2SO_4$.

The present invention gives good results with such viscoses also as are prepared by directly mixing the ingredients.

If desired, there may be added to the viscose one or more suitable substances known in the viscose-silk art, for example glycerine or glucose or sodium sulphate or sodium sulphite or sodium bisulphite or ammonium sulphate or an alkali silicate or an alkali aluminate or ammonia.

It will be seen from the foregoing statements that success in obtaining threads of dry tenacity, exceeding 2 grammes per denier by the use of sulphuric acid of about 55 per cent strength or more, depends upon many factors which vary with the particular strength of acid selected. It is impossible to indicate every condition for success in every particular case and it is to be understood that experiment cannot be avoided to find what are the conditions necessary for success when using a particular cellulose a particular form of viscose and particular details of the spinning operation. I give the following examples of carrying out the process without confining the invention to these particular examples.

*I (a) to (h)*

(*a*) Place 100 parts of wood pulp containing from 9–10 per cent of moisture, or 100 parts of linters containing 7–8 per cent of moisture, in 2000 parts of 18% caustic soda solution at 15° C. and allow to steep for three hours, then press the pulp until its total weight is 300 parts, or in the case of linters 340 parts, then grind it in a shredding machine for 2½ to 3 hours at 11° C, then without allowing the alkali cellulose to ripen for any further length of time, add 40 to 60 parts of carbon bisulphide and allow to react for 8 hours at 15 to 18° C., then blow off any excess carbon bisulphide for 10–15 minutes and dissolve the cellulose xanthate so obtained using so much water and caustic soda that the final solution on analysis contains about 6.5 per cent of cellulose and 8 per cent of NaOH. Filter the viscose three times through cotton wool, two filtrations being carried out soon after its preparation and the other just before spinning. Allow the viscose to age for 90–96 hours at 13–15° C., for spinning. Force the viscose at a rate of about 3 c. c. per minute through a platinum jet containing 24 holes, each of 0.12 mm. diameter into a bath containing 70 per cent of sulphuric acid at 8° C., giving the thread a length of immersion in the sulphuric acid for 80 cms. and then leading the thread through a passage in free air of at least 120 cms. and winding on a bobbin which rotates at such a speed that the thread is drawn at about 30 metres per minute. The thread thus produced is made up of filaments of about 3 to 4 deniers each. In the aforesaid air passage three glass rods are situated over which the thread runs and which create an additional suitably high stretching or tension of the threads. The bobbin runs with its lower portion in water so that the sulphuric acid is quenched, or considerably diluted, at or about the moment at which the thread reaches the bobbin. The threads are then washed, purified, dried, twisted and finished as usual. They possess a good lustre and a tenacity considerably higher than that of ordinary artificial silk. For instance, I am able by my process to obtain threads possessing a dry tenacity of more than 2 grammes per denier and in some cases the dry tenacity has been as large as or more than 4 grammes and even 5 grammes, while the wet tenacity is correspondingly high and may be, for instance, 1.5 to 2.5 grammes per denier or more.

(*b*) The mode of operation is as in (*a*), except that the viscose is forced at a rate of about 0.9 to 1.2 c. c. per minute through the platinum jet, and that the bobbin rotates at such a speed that the thread is drawn at about 18 metres per minute, so that the thread obtained is made up of filaments of about 1.5 to 3 deniers each.

(*c*) The mode of operation is as in (*a*) or (*b*), except that the temperature of the coagulating bath is 25° C.

(*d*) The mode of operation is as in (*a*), except that the temperature of the coagulating bath is 25° C. and that the length of immersion is 20 to 30 centimetres only.

(*e*) The mode of operation is as in (*a*) or (*b*), with the exception that the temperature of the coagulating bath is 40 to 45° C. and that the length of immersion is 20 to 30 centimetres only.

(*f*) The mode of operation is as in (*a*), or (*b*), with the difference that the bath contains about 55 per cent of sulphuric acid.

(*g*) The mode of operation is as in (*a*), or (*b*), except that the temperature of the coagulating bath is −5° C.

(*h*) The mode of operation is as in (*a*), or (*b*), or (*f*), or (*g*), with the exception that the viscose is allowed to age for 144 to 200 hours at 13 to 15° C. before spinning.

*II*

The mode of operation is as in Example I (*a*), or (*b*), or (*f*), with the difference that hydrochloric acid of 40 to 42 per cent is used as coagulating bath.

*III (a) to (c)*

(*a*) 100 parts of a sulphite-pulp or linters are impregnated with 900 to 2000 parts of a caustic soda solution of 18 per cent strength at 15° to 18° C. and the mixture is allowed to stand for 3 to 24 hours, Then the mass is pressed to 300 to 400 parts and comminuted by hand or in a suitable apparatus, for instance in a cooled shredder. The comminuted soda cellulose is then kept for 60 to 72 hours at room temperature, whereafter 30 to 60 parts of carbon bisulphide are added, and the mixture preferably while stirring (for example in a closed kneading machine) or agitating (for example in a sulphidizing drum), is kept for several (for example 4 to 8) hours at 16 to 20° C. Thereafter the excess of the carbon bisulphide is removed by driving off or evacuating, and then the sulphidized mass is dissolved in water or dilute caustic soda solution in such a manner that the viscose contains about 8 to 12 per cent of cellulose (determined in the known manner by precipitating with acid, washing and drying). If caustic soda solution is used as solvent it may for example be so chosen that if the amount of caustic soda that was present in the soda cellulose is taken into consideration the final viscose contains 5 to 8 per cent of caustic soda. The viscose solution thus obtained is then filtered in a known manner through cotton wool or a dense cotton fabric or through both and freed from gas bubbles. Immediately after, or after it has been allowed to ripen at 16–18° C. for a shorter (for example, 12 hours to two days) or a longer (for example, four days to seven days) time, the viscose is spun as in Example I into one of the following precipitating baths:

(1) Sulphuric acid of 50 to 55° Bé., or (2) Sulphuric acid of 45 to 50° Bé., or (3) A solution of 13.3 parts of ammonium sulphate in 120 parts of sulphuric acid of 50 to 55° Bé., to which 7 to 9 parts of sulphuric acid of 66° Bé., have been added, or (4) A solution of 10 to 15 parts of glucose in 190 to 185 parts by weight of sulphuric acid of 45 to 55° Bé.

The temperature of the coagulating bath is kept at 0 to 16° C. for instance at 8° C., or at −4° to −8° C.

The length of the threads immersed in the coagulating bath in which they are being formed may be short, for example 10 centimetres, or long, for instance from 30 to 100 centimetres and more. They are then collected on a bobbin or in a spinning centrifuge which may be placed either close by the precipitating bath or in a distance from 20 to 120 centimetres from the bath, whilst the sulphuric acid is quenched or diluted as in Example I. The threads are then further washed and dried.

The threads may be stretched in any known manner whilst they are in the coagulating bath, or after they have been removed from the bath, that is, between the coagulating bath and the collecting device. This may be done, for example, either by choosing a more or less long distance between the bath and the collecting device, or by leading the threads over rods or hooks arranged in the bath or between the bath and the collecting device, or in the bath and between the bath and the collecting device.

The speed of spinning may be varied within wide limits.

If no additional stretch to the thread is applied during spinning, it is recommendable to employ high speed.

Before the final washing, the threads may be treated in any known manner with a coagulating bath known in the viscose silk art, for example a solution of sodium bisulphate or sodium bisulphite or with dilute sulphuric acid or the like.

The washed threads may, before or after drying, be heated (for example, at 100–110° C.) or steamed.

They may also be treated with any desulphurizing or bleaching agent known in the viscose art.

(*b*) The mode of operation is as in (*a*), except that 75 or more parts of carbon bisulphide are used for the sulphidizing of the soda cellulose.

(*c*) The mode of operation is as in (*a*) or (*b*), with the difference that the soda cellulose is pressed to 200 parts.

*IV*

Mode of operation as in Example III (*a*), or III (*b*), or III (*c*), with the difference—

(1) That the sulphidized mass is dissolved in water or dilute caustic soda solution so as to yield a viscose that contains 5 to 8 per cent of cellulose, for instance, 6 to 7 per cent of cellulose (determined in the known manner by precipitating with acid, washing and drying).

(2) That as coagulating bath one of the following baths is used:

(1) Sulphuric acid of 55 to 60° Bé., or (2) Sulphuric acid of 50 to 55° Bé., or (3) A solution of 13.3 parts of ammonium sulphate in 120 parts of sulphuric acid of 50 to 60° Bé. to which 7 to 9 parts of sulphuric acid of 66° Bé. have been added, or (4) A solution of 10 to 15 parts of glucose in 190 to 185 parts of sulphuric acid of 55 to 60° Bé.

*V*

Mode of operation as in Example III (*a*), or III (*b*), or III (*c*), or as in Example IV, with the exception that the viscose is not allowed to mature at all, or to mature for 12 to 48 hours, only, and that as coagulating bath sulphuric acid of 60 to 64° Bé. for instance sulphuric acid of 62° Bé., at 6 to 10° C. is used.

In using so strong an acid it is preferable to run the spinning at a high speed, for example 40 to 60 metres a minute.

*VI (a) to (e)*

(*a*) 100 parts of sulphite-pulp or linters are impregnated with 900 to 2000 parts of a caustic soda solution of 18 per cent strength at 15 to 18° C., and the mixture allowed to stand for 3 to 24 hours. Then the mass is pressed to 300 parts in the case of sulphite pulp and to 340 parts in the case of linters and comminuted by hand or in a suitable apparatus, for instance, in a cooled shredder. Immediately or soon after (for example 1 hour) the comminution, 40 to 60 parts of carbon bisulphide are added, and the mixture, preferably while stirring (for example in a closed kneading machine) or agitating (for example in a sulphidizing drum) is kept for several hours (for example 4 to 12) at 16 to 20° C. Thereafter the excess of the carbon bisulphide is removed by driving off or evacuating, and the sulphidized mass, the weight of which generally amounts to from about 330 to 400 parts, is dissolved in 650 to 900 and in the case of linters even up to 1050 parts of a caustic soda solution of 6.5 to 10 per cent. strength. The viscose solution thus obtained is then filtered in a known manner through cotton wool or a dense cotton fabric or through both and freed from gas bubbles. Immediately after, or after it has been allowed to ripen at 15–18° C. for a shorter (for example 12 hours to two days) or a longer (for example four to seven days) time, the viscose is spun as in Example I into one of the following precipitating baths:—

(1) Sulphuric acid of 60° Bé., or (2) Sulphuric acid of 55° Bé., or (3) Sulphuric acid of 40 to 45° Bé., or (4) A solution of 13.3 parts of ammonium sulphate in 120 parts of sulphuric acid of 55 to 60° Bé., to which 9 to 10 parts of sulphuric acid of 66° Bé., have been added, or (5) A solution of 15 parts of ammonium sulphate in 120 parts of sulphuric acid of 40 to 45° Bé., to which 9 to 10 parts of sulphuric acid of 66° Bé. have been added.

(6) A solution of 10 to 15 parts of glucose in 190–185 parts of sulphuric acid of 55 to 60° Bé.

The temperature of the coagulating bath is kept at 0 to 16° C., for instance at 8° C. or at −4 to −8° C.

The threads are spun and treated during and after spinning in the same manner as described in the foregoing examples.

(*b*) The mode of operation is as in (*a*), with the difference that a caustic soda solution of 3 to 5 per cent strength is used for dissolving the sulphidized alkali cellulose. Accordingly, the viscose is somewhat more viscous.

(*c*) The mode of operation is as in (*a*), or (*b*), except that 75 or more parts of carbon bisulphide are used for sulphidising the alkali cellulose.

(*d*) The mode of operations is as in (*a*), or (*b*), or (*c*), with the difference that the alkali cellulose is pressed to 200 parts.

(*e*) The mode of operation is as in (*a*), or (*b*), or (*c*), or (*d*), with the difference that sulphuric acid of 62 to 64° Bé. at 8° C. is used as coagulating bath, the viscose being 12 to 48 hours old and the speed of spinning about 45 to 60 metres a minute.

*VII*

The method of preparing the viscose differs from that described in VI (*a*), or (*b*), or (*c*), or (*d*), or (*e*) in that the soda cellulose, after being pressed and comminuted and before being sulphidized, is allowed to ripen for 3 to 24 hours at 16 to 20° C. The amount and concentration of the caustic soda solution used for the dissolving of the sulphidized mass may be equal to those used in Example VI or somewhat lower, for example so as to produce a 10 to 12 per cent viscose (calculated on the parent cellulose).

The viscose is worked up into threads as in VI (*a*) to (*e*).

*VIII (a) to (d)*

(*a*) 80–100 parts of finely divided sulphite pulp or bleached cotton are mixed with 920–900 parts of a caustic soda solution of 8 to 10 per cent strength. To this mixture 40 to 150 parts of carbon bisulphide are added and the mixture kept at room temperature for 12 to 72 hours, preferably under continual or temporary stirring or kneading. The viscose solution thus obtained is filtered in a known manner through cotton wool or a dense cotton fabric or through both and freed from gas bubbles, if any. Immediately after, or after it has been allowed to ripen at 16 to 18° C. for a shorter (for example 12 hours to two days) or a longer (for example four days or seven days) time, the viscose is spun as in Example I into one of the following coagulating baths:

(1) Sulphuric acid of 55 to 60° Bé., or (2) Sulphuric acid of 45 to 50° Bé., or (3) A solution of 13.3 parts of ammonium sulphate in 120 parts of sulphuric acid of 45 to 60° Bé. to which 7 to 9 parts of sulphuric acid of 66° Bé. have been added, or (4) A solution of 10 to 15 parts of glucose in 190 to 185 parts of sulphuric acid of 45 to 60° Bé.

The temperature of the coagulating bath is kept at 0 to 16° C., for instance at 8° C. or at −4 to −8° C.

The threads are spun and treated as in the foregoing examples.

(*b*) Mode of operation as in (*a*), with the exception that the viscose is prepared according to the method 3 in the British specification No. 212,865, for example according to the following examples of that specification. I (*a*) to (*e*), or II (*a*) to (*c*), or III (*a*) to (*c*), or IV (*a*) to (*e*), or V (*a*) to (*b*), or VI (*a*) or (*c*), or VII to VIII, or IX to X, or XII, or XIII.

(*c*) Mode of operation as in (*a*), or (*b*), with the exception that, before or after the addition of carbon bisulphide, a small quantity of a catalyzer is added to the mixture of the cellulosic body with the caustic alkali solution, for example 0.2 to 1 part of a soluble chromic salt or nickel salt or iron salt.

(*d*) Mode of operation as in (*a*), or (*b*), with the difference that, before or after the addition of carbon bisulphide, a small quantity of a soluble peroxide, such as 5 to 20 parts of sodium peroxide to 100 parts of parent cellulose is added.

*IX*

100 parts of sulphite-pulp are placed in a cooled shredder adapted to be hermetically closed, whereupon 200 parts of a caustic soda solution of 12 to 20 per cent strength are added, preferably in small portions. As soon as the mass is homogeneous, 40 to 60 parts of carbon bisulphide are added, whereupon the shredder is closed. After 4 to 8 hours the mass is removed from the shredder and dissolved in 920 parts of a caustic soda solution of 6.15 per cent strength, the weight of the sulphidized mass being 330 parts. The final viscose contains 8 per cent of parent cellulose.

This viscose is filtered and spun and the threads are treated as in the foregoing examples.

*X (a) and (b)*

(*a*) A viscose prepared according to any one of the formulas given above is spun in a well-known manner into:

(1) A solution of ammonium sulphate of 25 to 30 per cent strength, or (2) In a bath consisting of 500 parts of sodium bisulphate, 76 parts of sulphuric acid of 66° Bé. and 587 parts of water, which bath may be kept at room temperature or at a raised temperature, for instance 50° C., or (3) In a bath consisting of 990 parts of water, 180 parts of ammonium sulphate, 15 parts of zinc sulphate, 135 parts of glucose and 255 parts of sulphuric acid of 66° Bé.

The formed thread is introduced directly from one of the foregoing baths into one of the following baths:

(1) Sulphuric acid of 55° Bé., or (2) Sulphuric acid of 45° Bé., or (3) A solution of 13.3 parts of ammonium sulphate in 120 parts of sulphuric acid of 50 to 55° Bé. to which 9 to 10 parts of sulphuric acid of 66° Bé. are added.

The temperature of the second bath may be kept below room temperature, for instance at 0° to 10° C., or at room temperature, or even above room temperature, for example at 25 to 45° C.

The length of immersion given the thread in the second bath may be short, for instance 20 centimetres, or long, for example 30 to 100 centimetres or more.

The threads are then collected whilst the sulphuric acid is quenched or diluted as described above, and the threads are finally washed, dried and treated as in Example I.

(*b*) Mode of operation as in (*a*), with the difference that as second bath hydrochloric acid of 40 per cent is used.

In all foregoing examples the arresting of the action of the acid may be also done by subjecting the thread leaving the coagulating bath consisting of, or containing the strong acid to a low temperature, for instance to −5 to −15° C. before washing.

Examples for producing staple fibre follow automatically from the foregoing examples.

According to the foregoing examples, it is possible to obtain artificial silk or staple fibre which has a considerably greater dry or wet tenacity than silk spun under the same spinning conditions, but by means of chemicals customary in the viscose silk art, for example by using a known precipitating bath.

For example, it is not difficult to produce by the present invention artificial silk having a dry tenacity of more than 2 grammes per denier, even more than 3 grammes per denier, for example 3 to 4 grammes per denier and more and a wet tenacity of 1.5 to 2.5 grammes per denier and more.

Instead of strong sulphuric acid there may be used in the foregoing examples a strong halogen hydracid, such as hydrochloric acid, for example of 35 to 40 per cent strength, or nitric acid, for example such as contains 60 to 90 per cent of $HNO_3$, or phosphoric acid, for example of 1.5 to 1.86 specific gravity, or arsenic acid, for example such as contains from 60 to 90 per cent of $H_3AsO_4$.

In the foregoing examples, in the preparation of viscose, instead of wood-pulp, there may be used bleached or unbleached cotton, or cellulose treated in the cold or in the heat with dilute acids, for example hydrochloric or sulphuric acid, in short any kind of cellulosic bodies used in, or proposed for, the manufacture of viscose.

The expression "artificial thread" in the description and claims is intended to include: artificial threads and filaments of any kind, for example artificial silk, staple fibre, artificial cotton, artificial wool, artificial hair and ribbon straw of any kind.

The expression "alkali cellulose which has been shortly matured" means either an alkali cellulose made from standard commercial cellulose of the type commonly provided for viscose manufacture, which alkali cellulose has been matured in the mercerization stage for a shorter period than is common in viscose manufacture (say, less than 36 hours at a temperature of 15–22° C.), or alkali cellulose in which the modification of the cellulose that characterizes the effect of maturing has been kept below that of the practice ordinarily followed in making silk by means of equivalent to a short period of maturing, such as by restriction of a catalytic action, a diminished temperature or the selection of a special type of cellulose. These means are well-known in the art.

The expression "strong mineral acid" means in the description and in the claims: sulphuric acid of at least 50 per cent $H_2SO_4$ and the other mineral acids equivalent in strength, i. e. hydrochloric acid of at least 35 per cent strength, nitric acid of at least 60 per cent strength, phosphoric acid of at least 1.5 specific gravity and arsenic acid of at least 60 per cent of $H_3AsO_4$.

The expression "strong sulphuric acid" or "sulphuric acid containing at least 50 per cent of sulphuric acid monohydrate" means in the description and claims: sulphuric acid of 50 to 98 or 100 per cent strength.

The expression "cellulose" used in the product claims is intended to mean: cellulose or cellulose hydrate, as the body regenerated from viscose is regarded by some cellulose chemists as cellulose, by others as cellulose hydrate.

The statements in the description and claims regarding percentages relate to percentages by weight.

The present application is a part-continuation of my copending application, Ser. No. 113,582 filed June 3, 1926.

I claim:—

1. Process for manufacturing artificial threads of high dry tenacity, exceeding 2 grammes per denier, from viscose, which comprises causing a viscose to pass through suitably formed openings into contact with a liquid which contains not less than about 65 per cent of sulphuric acid monohydrate.

2. Process for manufacturing artificial threads of high dry tenacity, exceeding 2 grammes per denier, from viscose, which comprises causing a viscose to pass through suitably formed openings into contact with a liquid which contains not less than about 65 per cent of sulphuric acid monohydrate, and checking the action of the strong sulphuric acid not later than the thread arrives at the collecting device.

3. Process for manufacturing artificial threads of high dry tenacity, exceeding 2 grammes per denier, from viscose, which comprises causing a viscose to pass through suitably formed openings into a bath containing not less than about 55 per cent of sulphuric acid monohydrate and applying additional stretch to the coagulated thread in the course of its passage after it enters the bath and before it is washed.

4. Process for manufacturing artificial threads of high dry tenacity, exceeding 2 grammes per denier, from viscose, which comprises causing a viscose to pass through suitably formed openings into a bath containing not less than about 55 per cent of sulphuric acid monohydrate, and applying additional stretch to the coagulated thread in the course of its passage after it enters the bath and before it is washed, and checking the action of the strong sulphuric acid not later than when the thread arrives at the collecting device.

5. The process of coagulating a viscose which comprises contacting it with at least one strong mineral acid of a strength equivalent to at least 50 per cent sulphuric acid monohydrate.

6. The process of coagulating a viscose which comprises contacting it with a liquid which contains at least about 50 per cent sulphuric acid monohydrate.

7. The process of coagulating a viscose which comprises contacting it with a liquid which contains not less than 55 per cent sulphuric acid monohydrate.

8. The process of manufacturing artificial thread of high dry tenacity which comprises contacting a threadlike stream of a viscose with at least one strong mineral acid of a strength equivalent to at least 50 per cent sulphuric acid monohydrate.

9. The process of manufacturing artificial thread of high dry tenacity which comprises contacting a threadlike stream of a viscose with a liquid which contains at least about 50 per cent sulphuric acid monohydrate.

10. The process of manufacturing artificial thread of high dry tenacity which comprises contacting a threadlike stream of a viscose with a liquid which contains not less than about 55 per cent sulphuric acid monohydrate.

11. The process of coagulating a viscose which comprises contacting it with at least one strong mineral acid of a strength equivalent to at least 50 per cent sulphuric acid monohydrate and checking the action of the acid before injurious effects upon the coagulated viscose occur.

12. The process of coagulating a viscose which comprises contacting it with a liquid which contains at least about 50 per cent sulphuric acid monohydrate and checking the action of the acid before injurious effects upon the coagulated viscose occur.

13. The process of coagulating a viscose which comprises contacting it with a liquid which contains not less than 55 per cent sulphuric acid monohydrate and checking the action of the acid before injurious effects upon the coagulated viscose occur.

14. The process of manufacturing artificial thread of high dry tenacity which comprises contacting a threadlike stream of a viscose with at least one strong mineral acid of a strength equivalent to at least 50 per cent sulphuric acid monohydrate and checking the action of the acid before injurious effects upon the thread occur.

15. The process of manufacturing artificial thread of high dry tenacity which comprises contacting a threadlike stream of a viscose with a liquid which contains at least about 50 per cent sulphuric acid monohydrate and checking the action of the acid before injurious effects upon the thread occur.

16. The process of manufacturing artificial thread of high dry tenacity which comprises contacting a threadlike stream of a viscose with a liquid which contains not less than about 55 per cent sulphuric acid monohydrate and checking the action of the acid before injurious effects upon the thread occur.

17. The process of manufacturing artificial thread of high dry tenacity which comprises contacting a threadlike stream of a viscose with a liquid which contains at least about 50 per cent sulphuric acid monohydrate and diluting the strong acid adhering to the thread by washing the thread before it is injured by the strong acid.

18. The process for manufacturing artificial bodies from a viscose which comprises bringing a viscose into the form of an artificial body and contacting said body with at least one strong mineral acid of a strength equivalent to at least 55 per cent sulphuric acid monohydrate.

19. The process for manufacturing artificial thread of high dry tenacity which comprises bringing a viscose into the form of an artificial thread and contacting it with at least one strong mineral acid of a strength equivalent to at least 50 per cent sulphuric acid monohydrate.

20. The process for manufacturing artificial thread of high dry tenacity which comprises bringing a viscose into the form of an artificial thread and contacting it with a liquid which contains at least about 50 per cent of sulphuric acid monohydrate.

21. The process for manufacturing artificial thread of high dry tenacity which comprises bringing a viscose into the form of an artificial thread and contacting it with a liquid which contains not less than about 55 per cent of sulphuric acid monohydrate.

22. The process for manufacturing artificial thread of high dry tenacity which comprises bringing a viscose into the form of an artificial thread and contacting it with at least one strong mineral acid of a strength equivalent to at least 50 per cent sulphuric acid monohydrate and checking the action of the acid before injurious effects upon the thread occur.

23. The process for manufacturing artificial thread of high dry tenacity which comprises bringing a viscose into the form of an artificial thread and contacting it with a liquid which contains at least 50 per cent of sulphuric acid monohydrate and checking the action of the acid before injurious effects upon the thread occur.

24. The process for manufacturing artifical thread of high dry tenacity which comprises bringing a viscose into the form of an artificial thread and contacting it with a liquid which contains not less than about 55 per cent of sulphuric acid monohydrate, and checking the action of the acid before injurious effects upon the thread occur.

25. The process for manufacturing artificial thread of high dry tenacity which comprises bringing a viscose into the form of an artificial thread and contacting it with a liquid which contains at least 50 per cent of sulphuric acid monohydrate and diluting the strong acid adhering to the thread by washing the thread before it is injured by the strong acid.

26. As a new product, artificial thread of the type as obtained by coagulating viscose in a bath containing a strong mineral acid of a strength equivalent to at least 50 per cent sulphuric acid monohydrate, consisting substantially of regenerated cellulose and having a dry tenacity of considerably more than 2 grammes per denier.

27. As a new product, artificial thread of the type as obtained by coagulating viscose, in a bath containing a strong mineral acid of a strength equivalent to at least 50 per cent sulphuric acid monohydrate, consisting substantially of regenerated cellulose and having a dry tenacity of more than 3 grammes per denier.

28. As a new product, artificial thread of the type as obtained by coagulating viscose in a bath containing a strong mineral acid of a strength equivalent to at least 50 per cent sulphuric acid monohydrate, consisting substantially of regenerated cellulose and having a dry tenacity of more than 4 grammes per denier.

29. As a new product, artificial thread of the type as obtained by coagulating viscose in a bath containing a strong mineral acid of a strength equivalent to at least 50 per cent sulphuric acid monohydrate, consisting substantially of regenerated cellulose and having a wet tenacity of more than 1.5 grammes per denier.

30. As a new product, artificial thread of the type as obtained by coagulating viscose in a bath containing a strong mineral acid of a strength equivalent to at least 50 per cent sulphuric acid monohydrate, consisting substantially of regenerated cellulose and having a wet tenacity of more than 2 grammes per denier.

31. The process of coagulating a viscose which comprises contacting it with a liquid which contains at least 65 per cent sulphuric acid monohydrate.

32. The process of manufacturing artificial bodies from a viscose which comprises bringing a viscose into the form of an artificial body and contacting said body with a liquid which contains at least 65 per cent sulphuric acid monohydrate.

33. The improved process of making filaments of regenerated cellulose silk and the like, which comprises spinning the alkaline solution containing a dissolved cellulose compound into a bath containing such a high concentration of an acid coagulating agent as to produce a plasticizing effect on the coagulated filaments the filaments being under sufficient tension during some part of the time of contact with such agent, to cause a substantial elongation of the filaments.

34. The improved process of making filaments of regenerated cellulose silk and the like, which comprises spinning the alkaline solution containing a dissolved cellulose compound into a bath containing sulphuric acid of not substantially below 50% concentration to produce a plasticizing effect on the coagulated filaments, the filaments being under sufficient tension during some part of the time of contact with such bath, to cause a substantial elongation of the filaments.

35. The improved process of making artificial regenerated cellulose filaments of high tensile strength, which comprises introducing fine streams of viscose into a setting bath, which contains such a high concentration of acid coagulating agent, that it will have a plasticizing effect upon the coagulated filaments, the spinning being conducted at high speed and the filaments being under sufficient tension while in contact with such bath to cause substantial elongation of the artificial filaments during such treatment.

36. The improved process of making artificial filaments of high tensile strength, which comprises, introducing fine streams of viscose into a setting bath, which contains such a high concentration of coagulating agent, that it will have a plasticizing effect upon the coagulated filaments.

37. As a new product, artificial thread consisting substantially of regenerated cellulose and having a dry tenacity of considerably more than 2 grams per denier.

38. As a new product, artificial thread consisting substantially of regenerated cellulose and having a dry tenacity of more than 3 grams per denier.

39. As a new product, artificial thread consisting substantially of cellulose regenerated from viscose, and having a dry tenacity of more than 4 grams per denier.

40. As a new product, artificial thread consisting substantially of cellulose regenerated from viscose and having a wet tenacity of more than 1.5 grams per denier.

41. As a new product, artificial thread consisting substantially of regenerated cellulose and having a wet tenacity of more than 2 grams per denier.

42. As a new product, artificial thread consisting substantially of cellulose regenerated from viscose, and having a dry tenacity of not substantially below 5 grams per denier.

43. As a new product, artificial thread consisting substantially of cellulose regenerated from viscose and having a wet tenacity of not substantially below 2.5 grams per denier, and having a silky luster.

44. As a new product, artificial thread consisting substantially of regenerated cellulose, having a dry tenacity not below 2 grams per denier and a wet tenacity not substantially below 1.5 grams per denier.

LEON LILIENFELD.